(12) United States Patent
Rapicault et al.

(10) Patent No.: US 7,886,286 B2
(45) Date of Patent: Feb. 8, 2011

(54) INTEGRATION OF NON-COMPONENTIZED LIBRARIES IN COMPONENT-BASED SYSTEMS

(75) Inventors: Pascal Rapicault, Ottawa (CA); Jeffrey A. McAffer, Ottawa (CA); Thomas J. Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/381,831

(22) Filed: May 5, 2006

(65) Prior Publication Data

US 2007/0260633 A1 Nov. 8, 2007

(51) Int. Cl.
G06F 9/45 (2006.01)
G06F 9/44 (2006.01)
(52) U.S. Cl. ........................................ 717/166; 717/107
(58) Field of Classification Search .................. 717/166, 717/107
See application file for complete search history.

(56) References Cited

U.S. PATENT DOCUMENTS

| | | | |
|---|---|---|---|
| 5,557,747 A * | 9/1996 | Rogers et al. ............... 709/223 |
| 6,230,312 B1 * | 5/2001 | Hunt ........................... 717/108 |
| 6,397,379 B1 * | 5/2002 | Yates et al. .................. 717/140 |
| 6,640,249 B1 * | 10/2003 | Bowman-Amuah ......... 709/228 |
| 6,748,396 B2 * | 6/2004 | Klicnik et al. ........... 707/103 Y |
| 6,763,452 B1 * | 7/2004 | Hohensee et al. ............ 712/227 |
| 6,834,391 B2 | 12/2004 | Czajkowski et al. |
| 7,316,010 B1 * | 1/2008 | Daynes et al. ............... 717/140 |
| 7,526,760 B1 * | 4/2009 | Daynes et al. ............... 717/153 |
| 7,565,533 B2 * | 7/2009 | Scheifler et al. ............. 713/167 |
| 2002/0184226 A1 * | 12/2002 | Klicnik et al. ............... 707/100 |
| 2003/0070161 A1 * | 4/2003 | Wong et al. .................. 717/148 |
| 2004/0003371 A1 * | 1/2004 | Coulthard et al. ............ 717/101 |
| 2004/0117799 A1 | 6/2004 | Brockway et al. |
| 2004/0255293 A1 * | 12/2004 | Spotswood .................. 717/176 |
| 2005/0028155 A1 | 2/2005 | Jung |
| 2006/0146057 A1 * | 7/2006 | Blythe ......................... 345/506 |
| 2006/0161888 A1 * | 7/2006 | Lovisa et al. ................. 717/107 |

* cited by examiner

*Primary Examiner*—Wei Y Zhen
*Assistant Examiner*—Chih-Ching Chow
(74) *Attorney, Agent, or Firm*—Daniel McLoughlin; Hoffman Warnick LLC

(57) ABSTRACT

A system and method for integrating legacy code into a component-based system. A component-based system is provided that allows legacy components to locate necessary artifacts, and includes: a context finder that is installed as a context classloader, wherein the context finder analyzes an execution stack to identify a component that initiated a context classloader call during runtime; and a buddy loading system that examines the component to determine if the component requires buddy loading to locate an artifact and locates the artifact using a predefined policy.

15 Claims, 2 Drawing Sheets

INTEGRATION OF NON-COMPONENTIZED LIBRARIES IN COMPONENT-BASED SYSTEMS

FIELD OF THE INVENTION

The invention relates generally to component-based systems, and more particularly, to a system and method for integrating non-componentized libraries in such component-based systems.

BACKGROUND OF THE INVENTION

Component-based software development focuses on building large software systems by integrating previously-existing software components. By enhancing the flexibility and maintainability of systems, this approach can potentially be used to reduce software development costs, assemble systems rapidly, and reduce the spiraling maintenance burden associated with the support and upgrade of large systems. At the foundation of this approach is the assumption that certain parts of large software systems reappear with sufficient regularity that common parts should be written once, rather than many times, and that common systems should be assembled through reuse rather than rewritten over and over.

Examples of component-based systems include ECLIPSE™, OSGi™ (Open Service Gateway Initiative), and .NET™. (.NET is a trademark of Microsoft Corporation in the United States, other countries, or both.) The concept of component-based systems is becoming increasingly popular. However, the inability to easily integrate third party libraries not designed for a component-based system (referred to herein as "non-componentized libraries") into component-based systems represents a major stumbling block to the adoption of the component approach. For the purposes of this disclosure, a non-componentized library is a type of library that assumes it has access to every class/resource it will ever need. Note also that for the purposes of this disclosure the term "legacy code" refers to a non-componentized library that has not been imported into a component-based system, and the term "legacy component" refers to legacy code that has been imported into a component-based system. The problems associated with integrating legacy code into a component-based system largely stem from issues relating to the classloader and context classloader.

A classloader is the means by which classes and resources are loaded into the execution environment. The classloader controls the policies ranging from where to load class definitions to the data format of the class definitions. More recently introduced is the notion of a context classloader. A thread's context classloader is, by default, set to the context classloader of the thread's parent. The hierarchy of threads is rooted at the primordial thread (the one that runs the program). The context class loader of the primordial thread is set to the classloader that loaded the application. So unless the thread's context classloader is explicitly changed, its context class loader will be the application's classloader. That is, the context classloader can load the classes that the application can load. This loader is used by the execution environment to load classes and resources on behalf of the user application.

In the absence of component-based systems, libraries and mechanisms such as HIBERNATE™ (hereinafter "Hibernate"), LOG4J™, SPRING™, EJBs™ and RMI™ solve their extensibility problems using JAVA's™ built-in mechanisms. (Java and all Java-based trademarks are trademarks of Sun Microsystems, Inc. in the United States, other countries, or both.) For example, client supplied classes are passed by name (and dereferenced using Class.forName( )) or added to the classpath of the current context classloader. Unfortunately, component-based systems need tighter control over the classloading strategy. In many cases, the normal classpath is simply ignored by the component-based system, and for others, managing the context classloader transitions are too onerous a task.

For example, Hibernate is a library that provides object to database (DB) mapping facilities. Its implementation needs to see user classes as well as mapping files to generate database tables and SQL statements. Since those classes and files are domain specific, they are not part of Hibernate. As such, Hibernate searches for the required artifacts using the context classloader or reflection. All required system, user and library classes must be available on the standard or context classpath.

Using Hibernate in Eclipse requires the developer to create a Hibernate plug-in, and create a plug-in "X" that contains the domain specific code (i.e., mapping files and classes) and depends on the Hibernate plug-in. Thus, plug-in X can see classes from Hibernate but not the reverse. At runtime, Hibernate's context classloader query for the needed classes fails because the default context classloader is the application classloader. In Eclipse, for instance, the classloader is not equipped to perform the needed functionality. Next, Class.forName( ) is used. However, because Hibernate cannot see the code associated with plug-in X, this lookup also fails.

The only way Hibernate can find plug-in X's classes is if the client code supplied plug-in X's classloader as the context classloader prior to calling Hibernate. This approach works but is cumbersome as programmers must ensure they set and unset the context classloader at appropriate times. It is also quite brittle in that in more complex scenarios, the call to Hibernate may go through several layers of indirection. For example, if plug-in X calls some other library "L" and L is implemented using Hibernate, plug-in X must know to set the context classloader. This breaks the encapsulation of L (i.e., L's implementation leaks out) and forces implementation restrictions on L.

In order to address this deficiency, there are a series of existing technologies and approaches. While some of these work, they do not provide a generalized solution.

(1) Containers and applications (e.g., EJB): Some systems have solved this issue by establishing clear boundaries between "containers" and the "applications" they contain. Here, the non-componentized library is added as part of the container and is available to all applications. The container observes all boundary crossings and prepares the system for specific operations (e.g., setup the context classloader). This technique demands a very strict component structure and forces users to use well-known APIs (application programming interfaces).

(2) Instrumentation (byte code instrumentation, Aspect, code generation, etc.): Runtime or compile time instrumentation can be used to change reflection and context classloader calls to access the component mechanism instead. Unfortunately, the library's client code is not available on all platforms, instrumentation can be costly, and it adds an extra level of complexity for the programmer and system implementer.

(3) Wrapping: The initial library can be wrapped to ensure that the extensibility mechanism is initialized (i.e., the context classloader is set). If the full library is wrapped, the technique is quite expensive as every usage incurs the wrapping overhead, even if the extensibility mechanism is not ultimately used. Wrapping a library at a finer grain is detailed, brittle and untenable in most situations.

(4) Eclipse Extension/extension-points: Extensions and extension-points have been designed to address this issue of extensibility, however this mechanism is only available in Eclipse and requires the library to be programmed using specific APIs.

(5) OSGi Dynamic import: Dynamic Import allows OSGi components to dynamically discover and bind dependencies on packages. It was designed to solve a similar problem; however, it has the inconvenience of creating a strong dependency between the importer (i.e., the library) and the caller. For example, if the caller's component was updated, the library would have to be restarted since the system thinks it is consuming classes from the caller. This approach also requires the caller to export the packages containing the classes needed by the library. Often times, these classes are internal implementation details and should not be generally available.

Accordingly, a need exists for an improved system and method for integrating non-componentized libraries into component-based systems.

SUMMARY OF THE INVENTION

The present invention addresses the above-mentioned problems, as well as others, by providing a system and method for integrating legacy code into a component-based system.

In a first aspect, the invention provides a component-based system that enables legacy components to locate necessary artifacts, comprising: a context finder that is installed as a context classloader, wherein the context finder analyzes an execution stack to identify a component that initiated a context classloader call during runtime; and a buddy loading system that determines whether the component requires buddy loading to locate an artifact and that locates the artifact using a predefined policy.

In a second aspect, the invention provides a computer program product stored on a computer usable medium that allows legacy components to locate necessary artifacts in a component-based system, comprising: program code configured for providing a context finder to be installed as a context classloader, wherein the context finder can analyze an execution stack to identify a component that initiated a context classloader call during runtime; and program code configured for examining the component to determine if the component requires buddy loading to locate an artifact and for locating the artifact using a predefined policy.

In a third aspect, the invention provides a method for allowing legacy components to locate necessary artifacts in a component-based system, comprising: loading a context finder as a context classloader; executing a legacy component in which a call is generated using the context classloader; identifying the legacy component that made the call by searching the execution stack with the context finder; determining if the legacy component includes a mark-up that indicates buddy loading is required; examining the mark-up to determine a policy to be used to find an artifact required by the component; and locating the artifact using the policy.

In a fourth aspect, the invention provides a method for deploying a component-based system that allows legacy components to locate artifacts, comprising: providing a computer infrastructure being operable to: install a context finder as a context classloader, wherein the context finder can analyze an execution stack to identify a component that initiated a context classloader call during runtime; examine the component to determine if the component requires buddy loading to locate an artifact; and locate the artifact using a predefined policy.

In a fifth aspect, the invention provides a component-based system that allows legacy components to locate necessary artifacts, comprising a context finder that is installed as a context classloader, wherein the context finder analyzes an execution stack to identify a component that initiated a context classloader call during runtime.

In a sixth aspect, the invention provides a component-based system that allows legacy components to locate necessary artifacts, comprising: a system that determines whether a component requires buddy loading to locate an artifact; and a system that locates the artifact using a predefined policy.

Features of the present invention include: transparency, in that non-componentized libraries are integrated without modification to either the client or the library code; independence, in that the processes do not rely heavily on particular component system structures (e.g., the rigors of the application and container separation described above are not required); and extensibility, in that both the buddy loading and context finder mechanisms support arbitrary policies for discovery (of buddies and contexts, respectively).

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
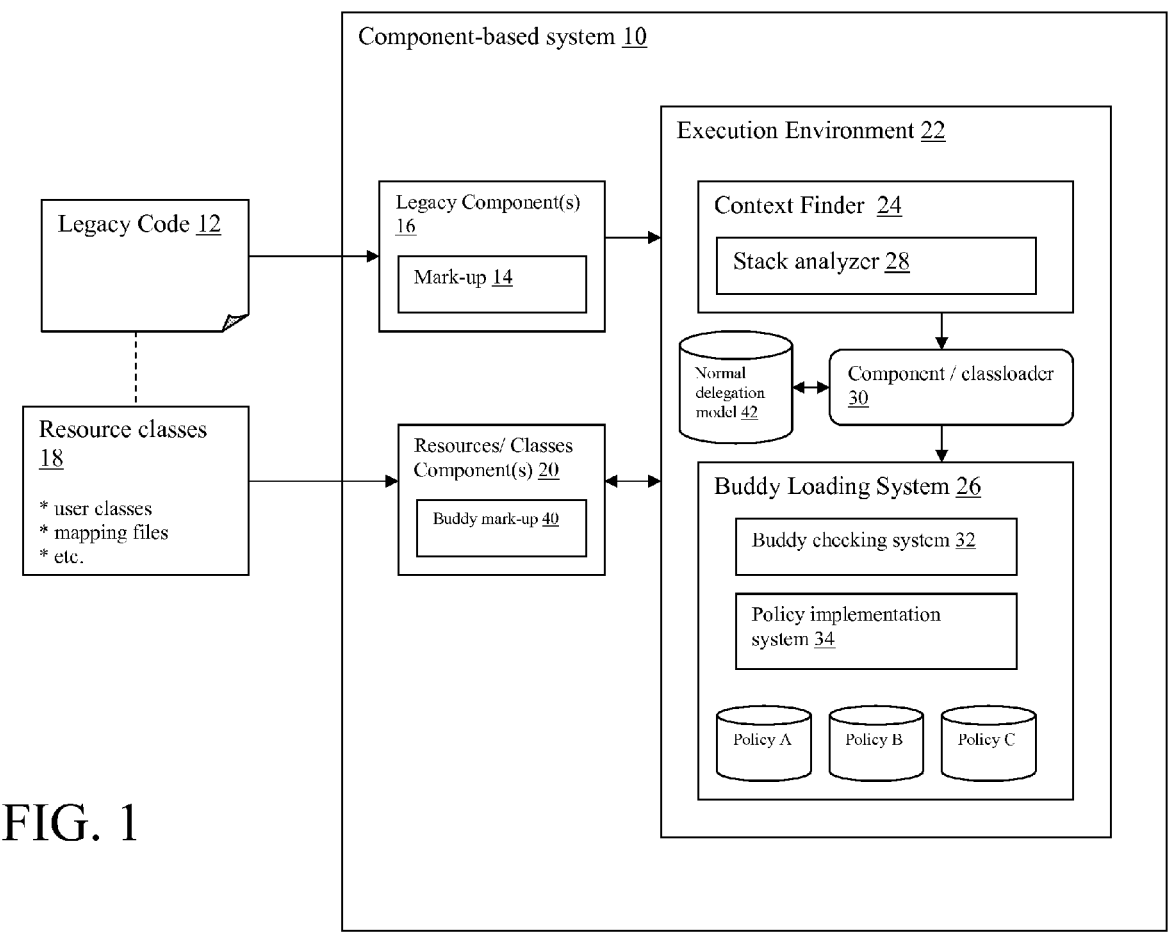
FIG. 1 depicts a component-based system in accordance with an embodiment of the present invention.

Referring now to the Figures, FIG. 1 depicts an illustrative example of a component-based system 10 (also referred to herein as "framework 10") for developing software applications. Examples of such component-based systems 10 include, but are not limited to, Eclipse, OSGi and .NET. As noted above, existing component-based systems have difficulty integrating third party, non-componentized libraries, i.e., legacy code 12. Examples of such legacy code 12 include, but are not limited to, Hibernate, Log4j, Spring, EJBs and RMI. Componentizing legacy code 12 guarantees that the loading of the code's classes and resources is handled by component-based system 10. As noted above, the difficulties involving integration stem from the fact that legacy code 12 may rely on artifacts, e.g., classes/resources 18, which cannot be found with the normal delegation model 42. Accordingly, when legacy code 12 is imported into component-based system 10 (to create legacy component(s) 16) and then run in execution environment 22, legacy component(s) 16 cannot see imported classes/resources component(s) 20 using the default context classloader.

To address this, the component-based system 10 of the present invention provides a context finder 24 and buddy loading system 26 that operate within the execution environment 22 of the framework 10 to allow legacy component(s) 16 the ability to see and resolve any necessary artifacts, e.g., resources/classes component(s) 20. As explained in further detail below, context finder 24 is used as the context classloader in the execution environment 22 of the framework 10 and thus enables the use of the buddy loading system 26 when context classloading is used. Buddy loading system 26 augments the normal lookup/delegation model by consulting additional parties, i.e., buddies. This additional lookup is triggered once the initial lookup by framework 10 has completed and failed. A distinct and configurable policy controls how buddies are discovered and consulted.

In order to implement this functionality, legacy code 12 is first annotated with a mark-up 14 as part of the componentization process when creating the legacy component 16. The mark-up 14 comprises any type of descriptor that indicates: (1) that the legacy component 16 needs buddies, e.g., a resource or class from another component; and (2) what policy should be used by the buddy loading system 26 to locate buddies. Note that if no policy is provided, a default policy could be utilized.

For example, in an Eclipse framework, bundles containing legacy code (i.e., legacy components 16) are modified to indicate both their buddy loading needs and policy using a header in their MANIFEST.MF. For example, the mark-up 14 "Eclipse-BuddyLoading: 'policy_A'" in the MANIFEST.MF may indicate that a bundle needs buddy loading and that 'policy_A' should be used.

In the illustrative example shown in FIG. 1, the necessary buddies required for legacy component 16 are found in resources/classes component(s) 20, which typically are imported into framework 10 as components. Depending upon how the policy for legacy component 16 is defined, each such resource/class component 20 may or may not include its own mark-up 40 indicating that it is a buddy.

At runtime, when the context classloader of legacy component 16 queries for needed classes, the context finder 24 is automatically implemented. The context finder 24 is installed when the component-based system 10 is started. This is done simply by installing the context finder 24 as the context classloader. The context finder 24 is a special classloader that includes a stack analyzer 28 that analyzes the execution stack (e.g., using SecurityManager application program interfaces "APIs") and discovers the appropriate classloader to use for the current operation (e.g., loadClass, findResource, etc.). This may be done by stepping down the stack looking at the classloader used to load the class for the method in each frame. Since component-based systems typically have at least one classloader per component, it is a straightforward process to map from frame to component. The typical case is to delegate loading to the component that triggered the current load operation. In an example where the legacy component 16 making the call comprises a Hibernate plug-in, the located component from the stack would be the Hibernate plug-in itself.

In summary, when the legacy component 16 queries for a needed class or resource, e.g., using getContextClassLoader.loadClass, context finder 24 is implemented to search the stack to determine what bundle, i.e., component/classloader 30, initiated the call. However, because of the nature of the legacy component 16, the normal delegation model 42 of the framework 10 generally will not be able find the necessary artifacts to resolve the call.

In this case, buddy loading system 26 may be implemented to track down the buddies, i.e., classes/resources component(s) 20, needed to resolve the call. Buddy loading system 26 gives legacy component(s) 16 a second chance when a class or resource cannot be found using the normal delegation model 42 of the component-based system 10. When a class or resource cannot be found using the normal delegation model 42, buddy loading system 26 utilizes a buddy checking system 32 that checks the legacy component 16 for a mark-up file 14 to see: (1) if the legacy component 16 needs to consult buddies; and (2) what buddy loading policy should be invoked. Policy implementation system 34 then implements the selected policy from a set of possible policies (e.g., Policy A, Policy B, or Policy C). Note that any number or type of policies may be made available.

Depending on the selected policy, information provided by other resources/classes component(s) 20 may influence whether they are to be selected as buddies. The buddies discovered by the policy are consulted one at a time until either the desired resource/class is found or all buddies have been queried. If the search fails to find a buddy, a traditional error response (e.g., ClassNotFoundException) may be emitted.

It should be understood that there may be scenarios where the buddy loading system 26 may be implemented without first using the context finder 24. Namely, there may be situations where the component/classloader 30 is known or can be determined without first searching the stack.

The following provides an illustrative example involving a Hibernate library imported to an Eclipse framework. First, a Hibernate plug-in is imported to framework 10, and is marked as needing "named" buddy loading, i.e., requiring a "named" policy. Secondly, a plug-in "X" is created that contains the domain specific code (mapping files and classes) and depends on the Hibernate plug-in. In this case, plug-in X includes a buddy mark-up 40 indicating that it is available to help Hibernate load classes (i.e., X is a buddy of Hibernate).

The Hibernate code remains unchanged as does X's. X simply uses Hibernate's normal API calls and does not set up the context classloader or any other infrastructure. The context finder 24 is hooked in on Eclipse startup and the stack analyzer 28 is set to look one level down in the stack to find the bundle that invoked the load operation. At runtime, Hibernate starts loading mapping files and classes by consulting the context classloader. This consultation triggers the analysis of the execution stack by stack analyzer 28. This analysis discovers the bundle that loaded the class whose method initiated the call to the context classloader call. In this case, it is Hibernate.

The Hibernate bundle is then asked to load the needed class. As with before, the target class is not found because it is not in Hibernate or one of its prerequisites. However, because Hibernate via its mark-up 14 indicated that it needs "named" buddy loading, Hibernate's "buddies" are asked to find the class before the class lookup fails. In this scenario, X is a buddy and is asked to supply the required class, which is can be readily found and returned.

In this example, the buddy relationship was set up using a policy in which explicit information is provided in both the markup 14 for Hibernate and the buddy mark-up 40 for X. However, it should be understood that the invention is not limited to a particular policy, and other alternative policies could likewise be used to find buddies.

Several illustrative policies are described below:

1. Dependent Policy:

The dependent policy transitively searches all components that depend on the component marked as needing buddy loading. The lookup stops when a result is found. In the example above, if Hibernate was marked as needing help from its dependents, then component X will be asked to load classes. This approach is convenient but can be expensive as it is poorly focused (i.e., there may be many dependents).

2. Named Policy:

The named policy requires one component to declare it needs help and zero or more other components to declare that they are willing to help. This is the case described in the example above. This approach is more precisely focused but requires more knowledge of the system and explicit information.

3. Global Policy:

The global policy is actually the opposite of the "named" policy since it searches all components in the execution environment 22. Only the component needing buddy loading (i.e., legacy component 16) help needs additional markup. This policy is akin to the OSGi "dynamic-import: *" but eliminates the strong dependency between the importer and the importee. This policy casts a very wide net and should only be used as a last resort.

4. Execution Stack Policy:

Whereas the dependent policy uses the static dependencies among components to determine the buddies of a component, this policy iterates over the execution stack and gathers the components currently executing code. Those components constitute the set of buddies. The depth to which the execution stack is searched is customizable. Note that the context finder 24 can implement a similar behavior since it has the capability of iterating over the execution stack.

Note that in OSGi, the actual buddy loading can be implemented as an extra step at the end of the normal OSGi delegation process, and policies can be discovered through a variety of means including OSGi service lookup using the policy name as the service filter.

Figure 2:
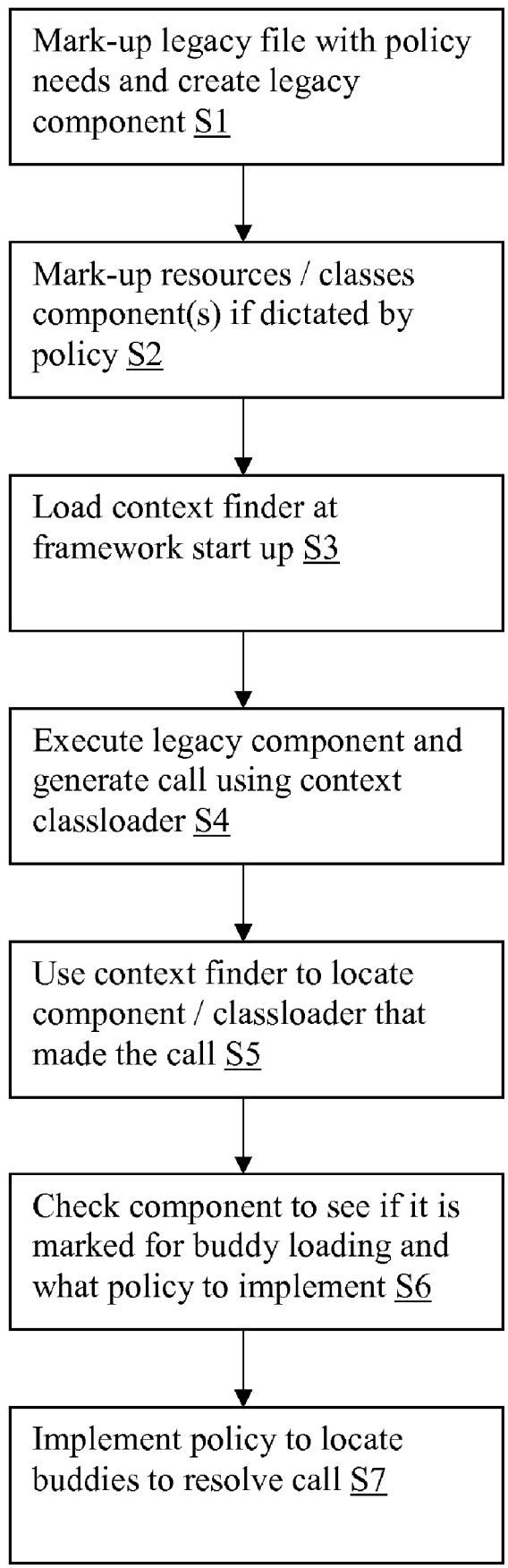
FIG. 2 depicts a flow diagram of a method of implementing an embodiment of the present invention.

Referring now to FIG. 2, a flow diagram of a method of implementing the buddy loading is shown, in which reference is made back to FIG. 1. At step S1, a file containing legacy code 12, which is known to need help loading classes/resources, is componentized and is modified to include a markup 14 indicating that buddy loading is required and the policy to be used. At step S2, the resources/classes component(s) needed by the legacy component 16 are marked up as "buddies" if dictated by the selected policy (e.g., if a named policy is used).

At step S3, the context finder 24 is loaded when the component-based system 10 is started. At step S4, the legacy component 16 is executed within the component-based system 10 and at some point generates a call using the context classloader. At step S5, the context finder locates the component/classloader that made the call by analyzing the execution stack.

At step S6, the component that made the call is checked to see if it is marked as requiring buddy loading, and if so, what policy is to be implemented to find the necessary buddy or buddies. Finally, at step S7, the dictated policy is implemented to locate buddies and resolve the call.

In general, component-based system 10 may be implemented on any type of computer system. Such computer system may be implemented as part of a client and/or a server, and generally includes a processor, input/output (I/O), memory, and bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Additional components, such as cache memory, communication systems, system software, etc., may be incorporated into the computer system.

Access to framework 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a component-based system 10 that includes buddy loading as described and claimed herein could be created, maintained and/or deployed by a service provider that offers the functions described herein for customers. That is, a service provider could offer to provide a component-based system that includes buddy loading as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A component-based system on at least one computer system, wherein the component-based system allows legacy components to locate necessary artifacts, the component-based system comprising:

a processor;
a context finder that is installed as a context classloader, wherein the context finder analyzes an execution stack to identify a classloader of a legacy component that initiated a context classloader call during runtime; and
a buddy loading system that determines whether the legacy component requires loading at least one buddy to locate an artifact that cannot be found with a normal delegation model, and the buddy loading system locates and loads the at least one buddy using a predefined policy, wherein the at least one buddy comprises a class or a resource component for locating the artifact for the legacy component, and wherein a requirement of buddy loading is determined by examining a mark-up comprising a descriptor that indicates the legacy component requires at least one buddy, and indicates the predefined policy used to locate the at least one buddy, and wherein the predefined policy includes one of the following: a dependent policy, a named policy, a global policy, and an execution stack policy.

2. The component-based system of claim 1, wherein the artifact comprises a class.

3. The component-based system of claim 1, wherein the artifact comprises a resource.

4. The component-based system of claim 1, wherein the dependent policy searches all components that depend on the legacy component marked as requiring buddy loading, and stops when a result is found.

5. The component-based system of claim 1, wherein the named policy requires a set of other components to include mark-ups comprising descriptors indicating that they are available as buddies for the legacy component.

6. The component-based system of claim 1, wherein the global policy requires the legacy component to include a mark-up comprising a descriptor that indicates that buddy loading is required, and then searches all components in an associated running environment.

7. The component-based system of claim 1, wherein the execution stack policy uses static dependencies among components to determine a set of buddies of the legacy component by iterating over the execution stack to identify all components currently executing code.

8. A computer program product stored on a computer storage medium that allows legacy components to locate necessary artifacts in a component-based system, comprising:
program code configured for providing a context finder to be installed as a context classloader, wherein the context finder can analyze an execution stack to identify a classloader of a legacy component that initiated a context classloader call during runtime; and
program code configured for examining the legacy component to determine if the component requires loading at least one buddy to locate an artifact that cannot be found with a normal delegation model, and for locating and loading the at least one buddy using a predefined policy, wherein the at least one buddy comprises a class or a resource component for locating the artifact for the legacy component, and wherein a requirement of buddy loading is determined by examining a mark-up comprising a descriptor that indicates the legacy component requires at least one buddy, and indicates the predefined policy used to locate the at least one buddy, and wherein the predefined policy includes one of the following: a dependent policy, a named policy, a global policy, and an execution stack policy.

9. The computer program product of claim 8, wherein the artifact comprises a class.

10. The computer program product of claim 8, wherein the artifact comprises a resource.

11. A method for allowing legacy components to locate necessary artifacts in component-based system, comprising:
loading a context finder as a context classloader;
executing a legacy component in which a call is generated using the context classloader during runtime;
identifying the legacy component that made the call by searching the execution stack with the context finder;
determining if the legacy component includes a mark-up comprising a descriptor that indicates loading at least one buddy is required to locate an artifact that cannot be found with a normal delegation model;
examining the mark-up to determine a predefined policy to be used to load and locate the at least one buddy required by the legacy component, wherein the predefined policy includes one of the following: a dependent policy, a named policy, a global policy, and an execution stack policy; and
locating the artifact using the at least one buddy, wherein the at least one buddy comprises a class or a resource component for locating an artifact for the legacy component.

12. The method of claim 11, comprising an initial step of inserting the mark-up in the legacy component to indicate that the legacy component requires buddy loading.

13. The method of claim 11, wherein the artifact comprises a class.

14. The method of claim 11, wherein the artifact comprises a resource.

15. The method of claim 11, wherein the legacy component comprises a library.

\* \* \* \* \*